United States Patent [19]

Macks et al.

[11] Patent Number: 5,524,168
[45] Date of Patent: Jun. 4, 1996

[54] METHOD AND APPARATUS FOR DC MOTOR SPEED MONITORING

[75] Inventors: Harold R. Macks, Detroit; Steven P. Nimer, Walled Lake; Gregory J. Dygert, Warren, all of Mich.

[73] Assignee: Ford Motor Company, Dearborn, Mich.

[21] Appl. No.: 398,271

[22] Filed: Mar. 3, 1995

[51] Int. Cl.⁶ .................................................. H02P 5/165
[52] U.S. Cl. ...................... 388/814; 388/903; 388/907.5; 388/909
[58] Field of Search ...................... 318/805, 317, 318/318, 565, 798; 388/803, 814, 811, 805

[56] References Cited

U.S. PATENT DOCUMENTS

| | | |
|---|---|---|
| 3,508,134 | 4/1970 | Dosch et al. . |
| 3,936,710 | 2/1976 | Tanikoshi ................................. 318/318 |
| 4,246,521 | 1/1981 | Soeda et al. . |
| 4,525,660 | 6/1985 | Katto ....................................... 318/798 |
| 4,594,538 | 6/1986 | Schmitt .................................... 318/565 |
| 4,675,586 | 6/1987 | Eigner et al. . |
| 4,679,112 | 7/1987 | Craig . |
| 4,684,858 | 8/1987 | Ma et al. ................................. 318/317 |
| 4,841,207 | 6/1989 | Cheyne ................................... 388/811 |
| 5,015,928 | 5/1991 | Yang . |
| 5,146,148 | 9/1992 | Voet ........................................ 318/803 |
| 5,253,531 | 10/1993 | Walker et al. ........................... 73/650 |
| 5,268,623 | 12/1993 | Muller . |

Primary Examiner—William M. Shoop, Jr.
Assistant Examiner—Marlon Fletcher
Attorney, Agent, or Firm—Mark S. Sparschu; Roger L. May

[57] ABSTRACT

In two embodiments of the present invention, the speed of a DC motor is determined by examining the signal at the negative terminal of the motor. The signal is high-pass-filtered to extract the AC component of the signal. The frequency of this signal is, in almost all cases, proportional to the speed of the motor. This signal is then fed into a comparator, which converts the signal into a square wave, which is then input into a microprocessor. The microprocessor determines the frequency of the square wave. If the frequency of the square wave is below a threshold of acceptable motor speed, the microprocessor can turn off the motor and provide a malfunction indication. If the frequency of the square wave is above a second threshold of acceptable motor speed, the microprocessor can likewise turn off the motor and provide a malfunction indication.

3 Claims, 2 Drawing Sheets

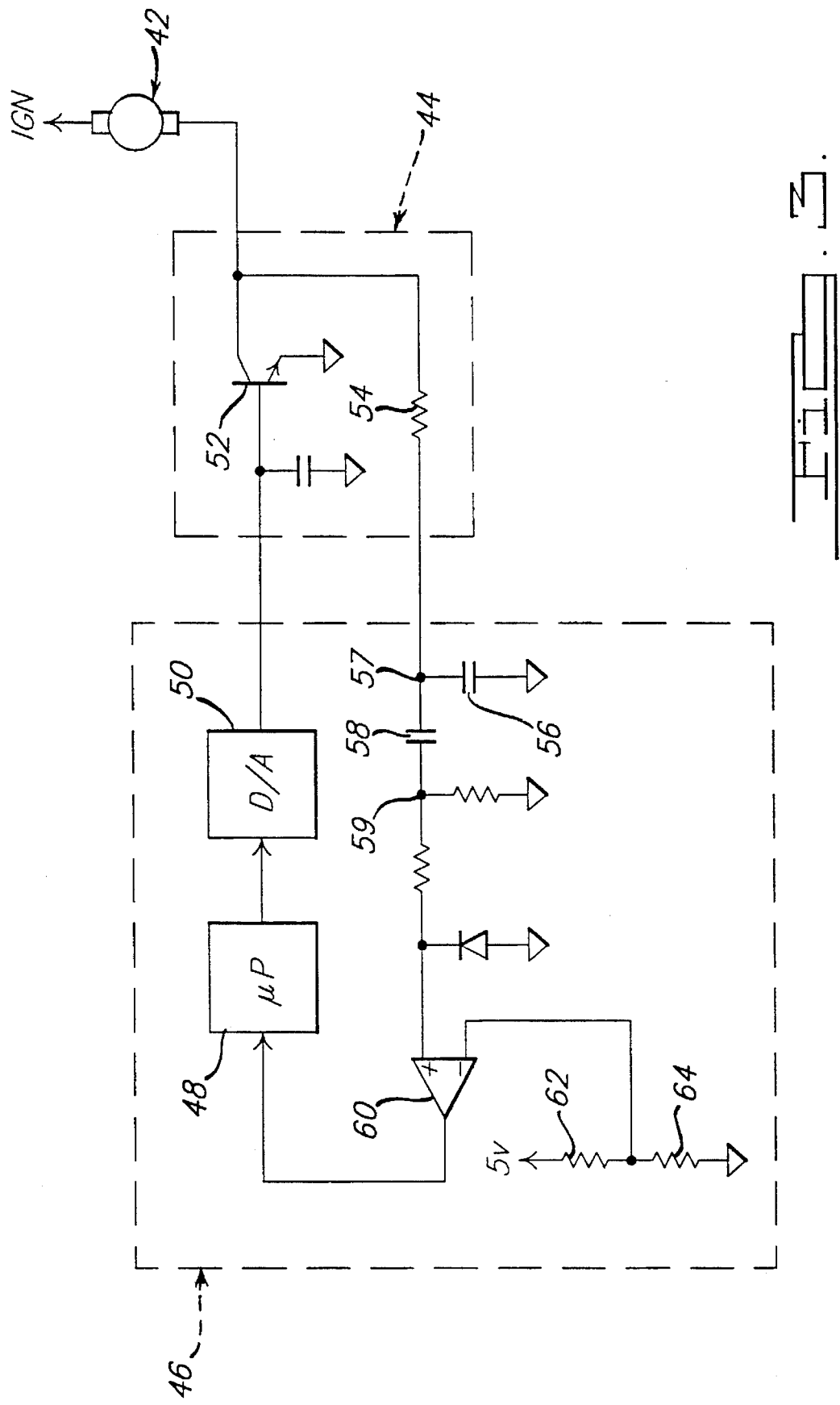

METHOD AND APPARATUS FOR DC MOTOR SPEED MONITORING

BACKGROUND OF THE INVENTION

1. Field of the Invention

The present invention relates to the field of DC motors, and more particularly to DC motor speed monitoring and diagnostics.

2. Description of the Related Art

Direct current (DC) motors are used for numerous applications. In many of those applications, it is desirable to know the speed at which the motor is running. Knowledge of the speed of the motor can help facilitate closed-loop control of the speed of the motor. Further, knowledge of the speed of the motor can be used to help detect motor fault conditions. For example, a motor can become mechanically overloaded. Such mechanical overloading can reduce the speed of the motor such that it does not operate as designed, as well as cause the motor to draw electrical currents above intended values.

One way to measure speed of a motor is to monitor the commutator signal of the motor. The frequency of this signal is proportional to the speed of a DC motor having brushes. Further, the frequency of the signal is proportional in almost all cases to the speed of a brushless DC motor. However, monitoring the commutator signal requires that an additional terminal be provided at the motor (as an output for the commutator signal) and at the controller for the motor (as an input for monitoring the commutator signal). Such increased terminal count increases the cost and decreases the reliability of the system. In some applications, such as in automobiles, cost constraints and reliability requirements are particularly stringent. Especially in such applications, a speed monitoring system for a DC motor which would not require the additional terminals herein described would provide cost and reliability advantages.

SUMMARY OF THE INVENTION

The present invention provides a method for monitoring the speed of a DC motor having a positive terminal and a negative terminal, the positive terminal coupled to a positive-voltage power source and the negative terminal coupled to a voltage lower than the voltage of the positive-voltage power source. The method includes the step of detecting the frequency of a signal at the negative terminal of the motor.

The present invention further provides an apparatus for monitoring the speed of a DC motor. The apparatus includes a DC motor with a positive terminal and a negative terminal. The positive terminal is coupled to a positive-voltage power source and the negative terminal is coupled to a voltage lower than the voltage of the positive-voltage power source. Further, the apparatus comprises a frequency detection circuit coupled to the negative terminal of the motor.

The present invention also provides an apparatus for monitoring the speed of a DC motor. The apparatus comprises a DC motor with a positive terminal and a negative terminal. The positive terminal is coupled to a positive-voltage power source and the negative terminal is coupled to a voltage lower than the voltage of the positive-voltage power source. The apparatus additionally includes means for detecting the frequency of a signal on the negative terminal of the motor.

The present invention enables the monitoring of the speed of a DC motor without adding terminals either to the motor or to the motor controller. In doing so, the invention provides cost and reliability advantages over alternative systems and methods for monitoring the speed of a DC motor.

BRIEF DESCRIPTION OF THE DRAWINGS

FIG. 3 is a schematic drawing of a system according to a second embodiment of the present invention.

DETAILED DESCRIPTION OF THE PREFERRED EMBODIMENT

Figure 1:
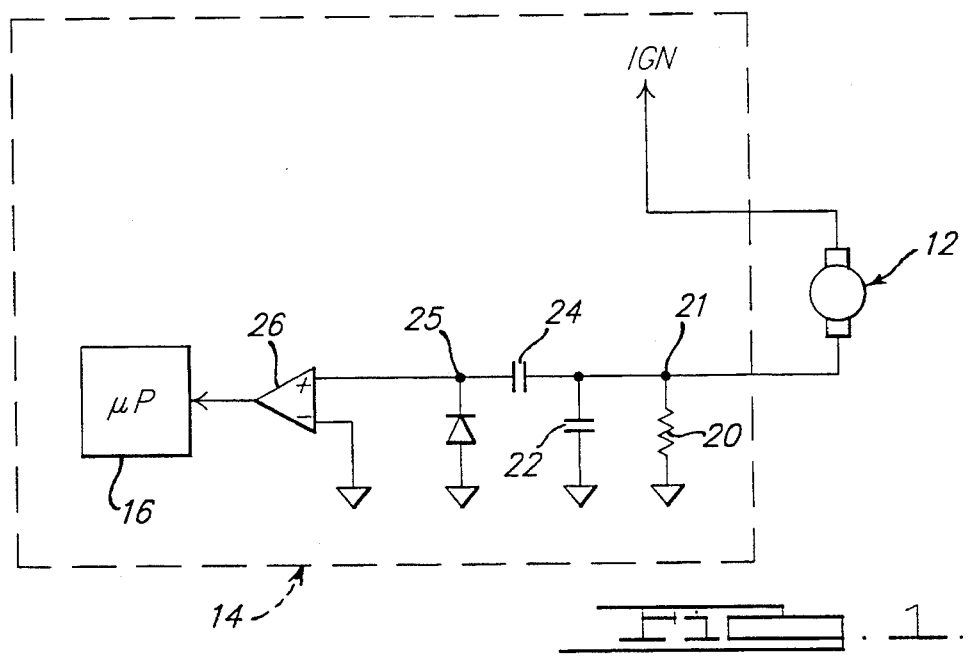
FIG. 1 is a schematic drawing of a system according to one embodiment of the present invention.

Referring to FIG. 1, one embodiment of the present invention will be described. FIG. 1 illustrates motor 12 and controller 14. Motor 12 is a brushless DC motor.

In FIG. 1, motor 12 is connected at its positive terminal to ignition voltage of a motor vehicle (nominally 12 volts). The negative terminal of motor 12 is connected to ground through resistor 20 within electronic module 14. One will recognize that motor 12 is intended in this case to be operated at a single speed, always intended to have a constant nominal voltage (here 12 volts) across it.

Electronic module 14 can provide a number of functions on the motor vehicle in which it is installed. One of such functions is monitoring the speed of motor 12. Another such function is logging and/or communicating a malfunction indication if the speed of motor 12 is out of its normal operating range.

Figure 2:
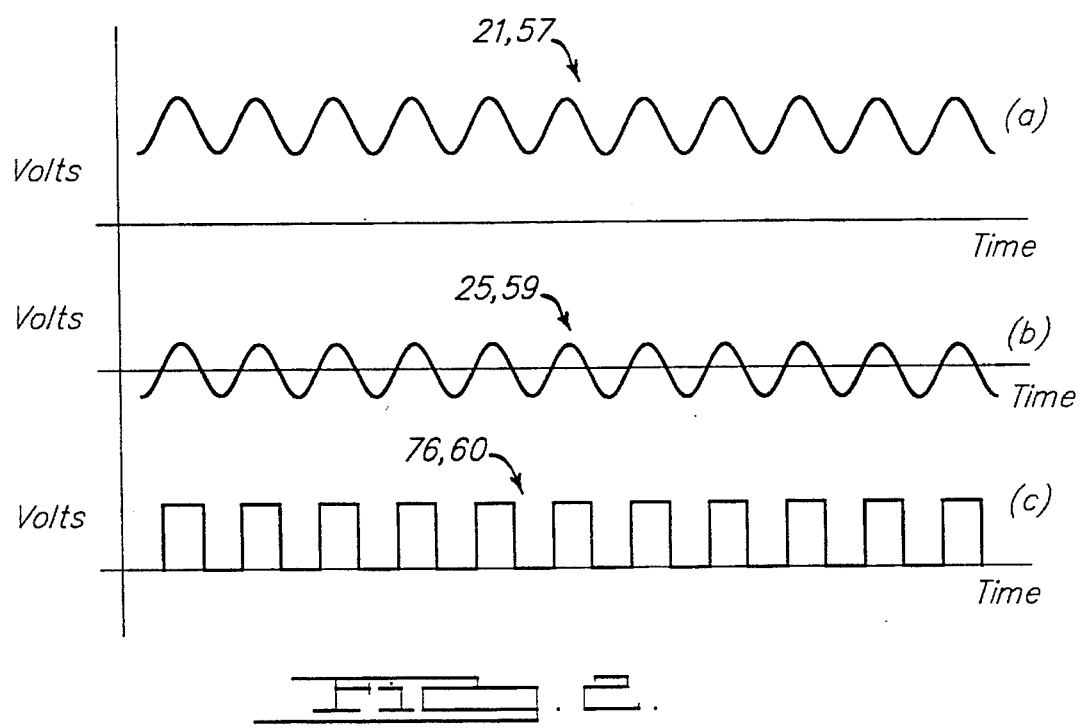
FIG. 2 is an illustration of three signals within the system of FIG. 1 and within the system of FIG. 3.

Electronic module 14 monitors the signal at the negative terminal of motor 12. That signal (which is also at node 21 within electronic module 14) is illustrated as curve (a) in FIG. 2. This curve illustrates that the signal at node 21 has an alternating current (AC) component as well as a direct current (DC) offset. The AC component is a consequence of the commutation occurring within motor 12.

Also within electronic module 14, capacitor 22 provides a small amount of low-pass filtering to remove high frequency noise from the signal on the negative terminal of motor 12. Capacitor 24 then provides high-pass filtering of the signal, to extract the alternating current (AC) component of the signal. The signal at node 25 the output of the high-pass-filtering provided by capacitor 24) is illustrated as curve (b) at FIG. 2. This curve illustrates that the DC offset shown in curve (a) is now substantially removed.

The signal is next fed into the non-inverting input of comparator 26. The inverting input of comparator 26 is connected to ground. Comparator 26 converts the signal at node 25 into a square wave, illustrated as curve (c) at FIG. 2. The square wave has a "high" amplitude (preferably 5 volts) when the signal at node 25 is greater than zero volts, and a "low" amplitude (preferably near zero volts) when the signal at node 25 is less than zero volts.

Microprocessor 16 then takes the square wave produced by comparator 26 and measures its frequency. (Those skilled in the art will recognize that there numerous ways for microprocessor 16 to measure frequency, including both hardware and software timers. Any such method of measuring frequency will work in the present invention.) If a 68HC11-series microprocessor is used, the square wave can be connected to an "input capture" input of microprocessor 16. When an edge of the square wave occurs, an interrupt is generated. The software in the microprocessor can then determine the elapsed time since the last pulse of the square wave, thus determining the frequency of the signal. The frequency of the signal is proportional to the speed of motor 12 for all cases except when motor 12 is stalled. When a brushless DC motor is stalled, the commutation signal generated by electronics within the motor typically goes to a high frequency. That frequency is reflected in the signal measured at node 21.

Microprocessor 16 compares the measured frequency against two predetermined frequencies. The first predetermined frequency is a lower limit for the acceptable speed of motor 12. This limit is preferably a function of ignition voltage, because the speed of motor 12 is a function of ignition voltage. If the measured frequency is below this lower limit, microprocessor 16 recognizes that motor 12 is rotating too slowly. The likely cause of this condition is an obstruction which slows the motor's rotation. Microprocessor 16 then provides a malfunction indication through (for example) lighting a warning lamp, logging a diagnostic trouble code in memory within electronic module 14, and/or communicating to another electronic device on the vehicle that motor 12 is not rotating within its intended speed range.

The second predetermined frequency is an upper limit of acceptable frequency. As with the lower limit, the upper limit is preferably a function of ignition voltage. If the measured frequency is above the upper limit, a likely cause is motor 12 being stalled, at which point the electronics in motor 12 will typically generate the above-described commutator pulses of high frequency. Microprocessor 16 then provides a malfunction indication through (for example) lighting a warning lamp, logging a diagnostic trouble code within electronic module 14, and/or communicating to another electronic device on the vehicle that motor 12 is not rotating within its intended speed range.

A second embodiment of the present invention is illustrated in FIG. 3. Here, motor 42 is a motor with brushes. Motor 42 is connected at its positive terminal to ignition voltage, typically 12 volts. The negative terminal of motor 42 is connected to the output of motor driver module 44, which will be described in more detail below. Motor driver module 44 is connected to controller 46.

Controller 46 comprises microprocessor 48. Microprocessor 48 controls the speed of motor 42 through providing a pulse-width-modulated (PWM) signal to digital-to-analog (D/A) converter 50. The analog output of D/A converter 50 is provided to motor driver module 44. It can be recognized that this particular system allows controller 46 to command motor 42 at variable speeds.

Within motor driver module 44, the signal from D/A converter 50 is provided to transistor 52, whose output is coupled to the negative terminal of motor 42. Transistor 52 will turn on motor 42 to a speed determined by the magnitude of the voltage of the signal provided to transistor 52 by D/A converter 50.

The signal at the negative terminal of motor 42 is provided through resistor 54 to controller 46. Within controller 46, capacitor 56 provides a small amount of low-pass filtering to reduce high-frequency noise. The signal at node 57 is illustrated as curve (a) of FIG. 2. As has been discussed in connection with the embodiment of FIG. 1, the signal illustrated at curve (a) has an AC component and a DC offset.

The signal is then provided to capacitor 58, which high-pass-filters the signal to extract the AC component. The signal at node 59 (the output of capacitor 58) is illustrated as curve (b) of FIG. 2. Here, the DC offset of curve (a) is reduced or substantially removed.

The signal is next provided to the non-inverting input of comparator 60. The inverting input of comparator 60 is connected to ground or to a voltage divider comprising resistors 62 and 64. (Whether ground or a voltage divider is used depends upon how much DC offset remains in the signal at the non-inverting input of comparator 60. Ground is preferably used if little or no DC offset remains.) The output of comparator 60 is a square wave, preferably with an amplitude of 5 volts. This square wave has the 5-volt amplitude when the signal at the non-inverting input to comparator 60 is greater than the signal at the inverting input, and an amplitude near zero volts otherwise.

Microprocessor 48 compares the measured frequency against a predetermined frequency. The predetermined frequency is a lower limit for the acceptable speed of motor 42. (This limit is preferably a function of ignition voltage and of the output voltage of D/A converter 50, because the speed of motor 42 is a function of those two variables.) If the measured frequency is below this lower limit, microprocessor 48 recognizes that motor 42 is rotating too slowly. The likely cause of this condition is an obstruction which impedes or completely stalls the motor's rotation. Such a condition likely is accompanied by an excessively large current draw by motor 42. As a result, if the measured frequency is below the lower limit, microprocessor 48 turns off motor 42 as a protection measure. Microprocessor 48 can also provide a malfunction indication through (for example) lighting a warning lamp, logging a diagnostic trouble code within controller 46, and/or communicating to another electronic device on the vehicle that motor 42 has a malfunction.

Various other modifications and variations will no doubt occur to those skilled in the arts to which this invention pertains. Such variations which generally rely on the teachings through which this disclosure has advanced the art are properly considered within the scope of this invention. This disclosure should thus be considered illustrative, not limiting; the scope of the invention is instead defined by the following claims.

What is claimed is:

1. A method for monitoring the speed of a DC motor having a positive terminal and a negative terminal, the positive terminal coupled to a positive-voltage power source and the negative terminal coupled to a voltage lower than the voltage of the positive-voltage power source, said method comprising the steps of:

detecting the frequency of a signal at the negative terminal of said motors;

comparing said frequency to a first predetermined value;

providing a malfunction indication if said frequency is less than said first predetermined value;

comparing said frequency to a second predetermined value; and providing a malfunction indication if said frequency is greater than said second predetermined value;

wherein said step of detecting comprises the step of high-pass filtering said signal at the negative terminal of said motor to produce a high-pass-filtered signal; and wherein said step of detecting further comprises amplifying said high-pass-filtered signal to produce a square wave; and wherein said motor is brushless and wherein said second predetermined value is a frequency attained if a rotor of said motor becomes stalled.

2. A method for monitoring the speed of a DC motor having a positive terminal and a negative terminal, the positive terminal coupled to a positive-voltage power source and the negative terminal coupled to a voltage lower than the voltage of the positive-voltage power source, said method comprising the steps of:

detecting the frequency of a signal at the negative terminal of said motor;

comparing said frequency to a predetermined value; and providing a malfunction indication if said frequency is greater than said predetermined value;

wherein said motor is a brushless motor and said predetermined value is a frequency attained when a rotor of said motor is stalled.

3. An apparatus for monitoring speed of a DC motor, said apparatus comprising:

a DC motor with a positive terminal and a negative terminal, the positive terminal coupled to a positive-voltage power source and the negative terminal coupled to a voltage lower than the voltage of the positive-voltage power source;

means for detecting a frequency of a signal on said negative terminal of said motor;

means for comparing said detected frequency to a first predetermined value; and means for providing a malfunction indication if said frequency is greater than said predetermined value, wherein said motor is brushless and said predetermined value is a frequency attained when a rotor of said motor is stalled;

wherein said frequency-detecting means further comprises:

means for extracting an AC component of said signal on said negative terminal of said motor, said means further comprising a high-pass filter coupled in electrical communication with said negative terminal and a comparator coupled in electrical communication with an output of said high-pass filter to generate a square wave signal; and means for detecting the frequency of said AC component.

* * * * *